United States Patent [19]

Davis

[11] 4,013,555
[45] Mar. 22, 1977

[54] PROCESS FOR REDUCING BOD IN FOOD PROCESSING PLANT WASTES

[75] Inventor: William R. Davis, Richmond, Va.

[73] Assignee: Nalco Chemical Company, Oak Brook, Ill.

[22] Filed: Mar. 24, 1976

[21] Appl. No.: 669,931

[52] U.S. Cl. ............................................ 210/51
[51] Int. Cl.$^2$ ...................................... C02B 1/20
[58] Field of Search ............. 210/42, 45, 51, 52, 210/53, 54 A, 59

[56] References Cited

UNITED STATES PATENTS

| | | | |
|---|---|---|---|
| 1,620,333 | 3/1927 | Evans | 210/51 |
| 3,142,638 | 7/1964 | Blaisdell et al. | 210/51 X |
| 3,342,742 | 9/1967 | Cocks | 210/51 X |
| 3,624,019 | 11/1971 | Anderson et al. | 260/29.6 H |
| 3,801,501 | 4/1974 | Kennedy | 210/61 X |
| 3,966,600 | 6/1976 | Crowley et al. | 210/51 X |

FOREIGN PATENTS OR APPLICATIONS

| | | | |
|---|---|---|---|
| 816,399 | 7/1959 | United Kingdom | 210/52 |

OTHER PUBLICATIONS

Christman, "Sodium Aluminate Coagulation in the Filter Plant", National Aluminate Corp., Chicago, 1929, Bulletin No. 19.

*Primary Examiner*—Joseph Scovronek
*Assistant Examiner*—Arnold Turk
*Attorney, Agent, or Firm*—John G. Premo; Robert A. Miller; Barry W. Sufrin

[57] ABSTRACT

A process for reducing BOD in aqueous food processing plant wastes which comprises subjecting such wastes to the following series of sequential steps:
  A. adjusting the pH of the waste to 3 or less to form finely divided suspended particles;
  B. readjusting the pH of the waste with sodium aluminate to a value within the range of 6–7.5;
  C. flocculating the particles with an anionic acrylamide polymer; and then
  D. removing and collecting the flocculated particles from the food processing plant wastes.

2 Claims, No Drawings

PROCESS FOR REDUCING BOD IN FOOD PROCESSING PLANT WASTES

INTRODUCTION

Most food processing operations produce wastes that contain a variety of contaminants that must be removed therefrom prior to such wastes being injected into sewage systems, lakes, ponds and rivers.

Several methods are currently used to remove these wastes which comprise using conventional waste processing systems such as flotation systems, coagulation, and sedimentation operations and the like.

While these conventional treatments are capable of removing suspended material such as fats, inorganic solids and the like, they are relatively ineffective in removing soluble proteinaceous material which makes these wastes unacceptable for placing into sewage systems and the like due to their high BOD values.

The present invention provides a series of treating steps which not only removes existing suspended matter, but also removes large quantities of the dissolved BOD from such systems by converting the soluble proteinaceous material combined in these wastes into an insoluble form which is capable of being acted upon by conventional water-treating coagulating and flocculating agents.

The invention is capable of operating on a variety of food plant wastes. Thus, for example, it is capable of treating wastes from poultry and meat processing plants as well as other plants such as, for example, those processing a variety of naturally-occurring fats and oils. This process is also applicable to brewery wastes.

THE INVENTION

In accordance with the invention, it has been found that BOD may be reduced in aqueous food processing plant wastes by subjecting such wastes to the following series of sequential steps:
  A. adjusting the pH of the waste to 3 or less to form finely divided suspended particles;
  B. readjusting the pH of the waste with sodium aluminate to a value within the range of 6–7.5;
  C. flocculating the particles with an anionic acrylamide polymer; and then
  D. removing and collecting the flocculated particles from the food processing plant wastes.

In step A outlined above, the pH may be adjusted to 3 or less using any convenient source of an inexpensive acid such as sulfuric or hydrochloric acid. Sulfuric acid is quite satisfactory. In a preferred embodiment of the invention, pH is adjusted to about 2.5. At this low pH, any of the soluble protein contained in the waste is converted into insoluble, finely-divided particles which are suspended in the waste.

To coagulate these particles as well as other suspended particles originally present and render them subject to further processing with suitable flocculating agents, I have found that such can be accomplished by readjusting the pH of the waste water treated in Step A with sodium aluminate to 6–7.5. Preferably, the pH is adjusted with sodium aluminate within the range of between 6.5 and 7.0.

This pH adjustment with sodium aluminate produces a surprising result since as the pH of the system goes from 3 or less up to the higher values, none of the finely divided particles are redissolved. This means that these particles then are capable of being subsequently acted upon by a flocculating agent.

The flocculating agents I prefer to use in the practice of my invention comprise a group of anionic acrylamide polymers which have a molecular weight of at least 100,000 and, preferably, greater than 1,000,000. These polymers contain at least 5% by weight of acrylate groups which are preferably in the sodium salt form. In a preferred embodiment, I use acrylamide-acrylate copolymers which contain between 10–50% by weight of acrylate groups. A typical acrylamide polymer is an acrylamide polymer which contains 30% by weight of sodium acrylate.

These polymers are usually used at dosages ranging between 0.1–150 ppm.

In the case of small plant operations, I have found it extremely convenient to employ the anionic acrylamide polymers in the form of water and oil emulsions which may be readily inverted to produce aqueous solutions of the polymers. These water and oil emulsion-type polymers as well as their method for being solubilized by inversion is disclosed in Anderson, et al., U.S. Pat. No. 3,624,019, the disclosure of which is incorporated herein by reference.

EXAMPLE

To illustrate the efficacy of the invention, the following is presented.

The particular plant utilized for the study was a poultry processing plant which treated its aqueous wastes using a conventional air flotation system to remove fats and suspended matter.

Prior to the test, the treatment utilized was alum followed by an anionic acrylamide polymer to flocculate suspended particles. This alum polymer treatment gave the plant a 60–75% BOD reduction.

For the purpose of this test, the alum polymer treatment was discontinued and the process of this invention was substituted therefor.

At the start of the test, the plant influent was analyzed and was found to contain 765 mg/l of BOD and had a suspended solids content of 1120 mg/l of suspended solids. After this initial analysis, the test was started by first treating the effluent (pH 6.4) with sulfuric acid to reduce it to 2.5. When the pH reached 2.5, a fair amount of newly formed finely divided suspended matter could be detected.

After this treatment, the system was then treated with sodium aluminate to adjust the pH to 6.8. It was observed that little of the finely divided material formed by the acid treatment had redissolved. At this point there was added 10 parts per million of a 30% sodium acrylate acrylamide copolymer (molecular weight > 1,000,000) which formed the finely divided suspended matter into an easily floated floc which contained large particles. The floc material was floated away from the system and recovered. The final effluent was a light straw color. The BOD of the effluent was 135 milligrams per liter and the suspended solids were 560 milligrams per liter. These analyses were made on a 24-hour composite samples of the system. Thus, over the untreated system there was an 82.35% reduction in BOD. In another test on the same system run at a different time, the identical procedure was used. At this particular time, the BOD reduction amounted to 71.7%.

While the above example shows the invention operating upon a flotation system, it is understood it has equal applicability to removing wastes using conventional settling devices and ponding.

Having thus described my invention, it is claimed as follows:

1. A process for reducing BOD in the form of soluble proteinaceous material in aqueous food processing plant wastes which comprises subjecting such wastes to the following series of sequential steps:
   A. adjusting the pH of the waste to 3 or less to form finely divided suspended particles;
   B. readjusting the pH of the waste with sodium aluminate to a value within the range of 6–7.5;
   C. flocculating the particles with an anionic acrylamide polymer; and then
   D. removing and collecting the flocculated particles from the food processing plant wastes.

2. The process of claim 1 where the pH in Step A is adjusted to 2.5, and pH in Step B is adjusted between the range of 6.5–7, and the anionic acrylamide polymer is a 30% sodium acrylate-acrylamide polymer.

* * * * *